United States Patent [19]

Stanuch

[11] 4,319,306
[45] Mar. 9, 1982

[54] ELECTRICALLY SYNCHRONIZED ROTATING LIGHT SYSTEM

[75] Inventor: Edward S. Stanuch, Oak Forest, Ill.
[73] Assignee: Federal Signal Corporation, Oak Brook, Ill.
[21] Appl. No.: 135,103
[22] Filed: Mar. 28, 1980
[51] Int. Cl.³ .............................................. F21J 21/30
[52] U.S. Cl. ...................................... 362/35; 362/80; 362/249; 362/237
[58] Field of Search .................... 362/35, 80, 237, 249

[56] References Cited

U.S. PATENT DOCUMENTS

3,271,735  9/1966  Gosswiller ........................ 362/35 X

Primary Examiner—Stephen J. Lechert, Jr.
Attorney, Agent, or Firm—Charles F. Pigott, Jr.

[57] ABSTRACT

An electrically synchronized rotating light system comprising two or more rotating light assemblies each having an associated drive motor, there being in one embodiment a master light unit including a rotating light and drive motor which rotates the light at a predetermined rate, and one or more slave light units each including a rotating light and a slave drive motor, the master and slave units being electrically wired so the speed of rotation and phase of each slave unit is synchronized with the master unit without need for mechanical connections between the units. In another embodiment, two or more slave lights are provided, each having an associated slave drive motor, in combination with a master drive motor not associated with a corresponding light. In a further embodiment, each rotatable light has an associated motor mounted directly on the lampholder for conjoint rotation with the lampholder.

10 Claims, 7 Drawing Figures

ELECTRICALLY SYNCHRONIZED ROTATING LIGHT SYSTEM

BRIEF SUMMARY OF THE INVENTION

It is known in the art to mount rotating warning lights on police cars and other emergency vehicles, and it is known in particular to interconnect such rotating lights by mechanical drive means to synchronize them. Gosswiller U.S. Pat. No. 3,271,735, granted Sept. 6, 1966, discloses a light assembly for mounting on the roof of an emergency vehicle, including a common drive motor and two rotating warning lights interconnected by a drive chain engaged with sprocket members associated respectively with the lights.

Another mechanical means for synchronizing a plurality of rotating lights is to utilize an interconnecting gear train as disclosed in copending Gosswiller U.S. patent application, Ser. No. 868,075, filed Jan. 9, 1978, now U.S. Pat. No. 4,240,062 which patent is assigned to the assignee of the present invention.

It is a general object of the present invention to provide synchronization and phasing of multiple rotating lights by electrical means which requires the various rotating light assemblies to be interconnected solely by electrical wires, thereby permitting the lights to be located various distances apart without need to redesign a mechanical linkage between them.

A more specific object of the invention is to provide means which transmits electrical power to a slave drive motor only when the associated slave light is synchronized and in a predetermined phase relation with the master light.

The foregoing and other objects and advantages of the invention will be apparent from the following description of a preferred embodiment, taken in conjunction with the accompanying drawings.

Now, in order to acquaint those skilled in the art with the master of making and using my invention, I shall describe, in conjunction with the accompanying drawings, a preferred embodiment of the invention.

DETAILED DESCRIPTION OF THE INVENTION

Figure 1:
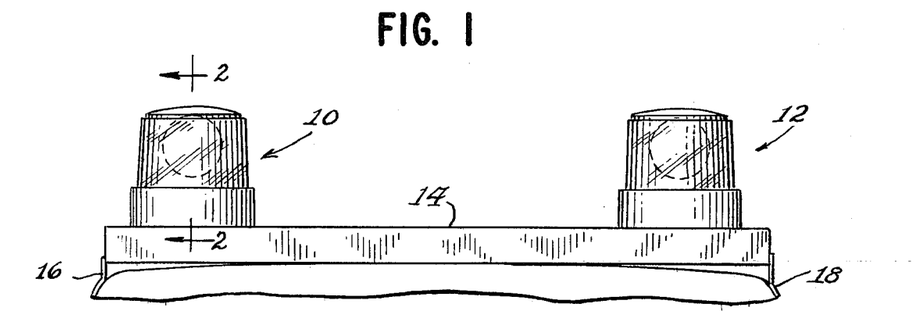
FIG. 1 is a fragmentary elevational view showing a pair of rotating lights mounted on the roof of an emergency vehicle and electrically synchronized in accordance with the present invention.

Referring now to the drawings, FIG. 1 shows a pair of rotating light assemblies 10 and 12 mounted on a common platform 14 secured to the roof of an emergency vehicle by clamp members shown at 16 and 18. It should be understood the platform 14 is shown merely by way of example as a common member for mounting the pair of rotating light assemblies 10 and 12. In accordance with the present invention, as will be described more fully hereinbelow, the only connection required between the two light assemblies comprises electric wires which can be housed in a flexible electrical cable.

Figure 2:
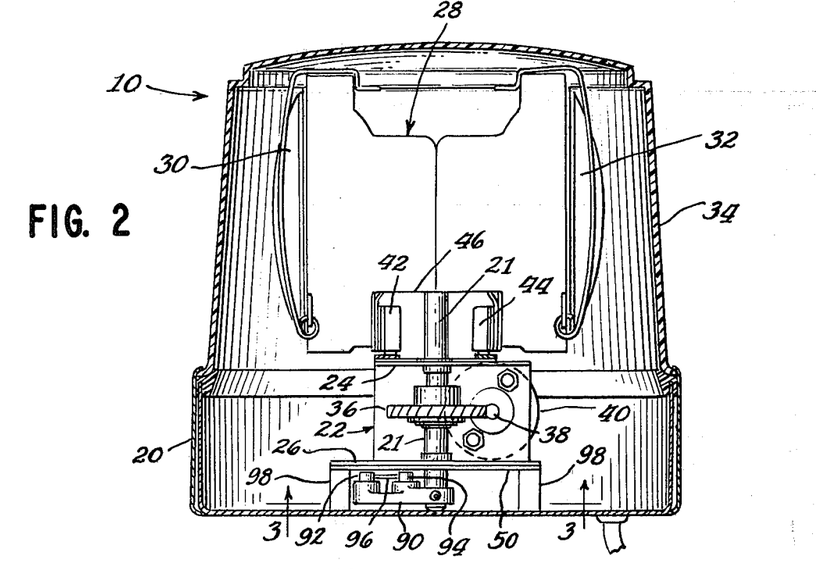
FIG. 2 is an enlarged vertical section, taken substantially along the line 2—2 of FIG. 1, illustrating one of the rotating lights and drive mechanism for rotating the same.

FIG. 2 illustrates the light assembly 10 in greater detail and shows a base member 20, and an upright mounting shaft 21 rotatably mounted in a supporting bracket 22 having bearing plate portions 24 and 26. The mounting shaft 21 has a lamp holder assembly 28 mounted on its upper end, and, in the particular embodiment being described, the lamp holder assembly includes a pair of oppositely disposed lamps 30 and 32. A transparent plastic dome 34 mounts on the base 20 and encloses the lamp holder assembly.

The mounting shaft 21 has a worm gear 36 fixedly mounted thereon and engaged with a worm 38 driven by a drive motor 40. It will thus be understood the drive motor 40 rotates the lamp holder assembly 28 about the axis of the shaft 21. In addition, a pair of brushes 42 and 44 are supported on a bracket or arm 46 mounted on shaft 21 for rotation therewith, whereby the two brushes rotate with the light assembly about the axis of shaft 21. As is known in the art, the brushes 42 and 44 contact a collector ring (not shown) mounted immediately beneath the brushes for supplying electrical power to the rotatable lamps 30 and 32.

The foregoing features of a rotating light assembly are generally known in the art. However, the present invention concerns electrical means for synchronizing two or more such light assemblies. Certain preferred embodiments of such electrical synchronization means will now be described.

Figure 3:
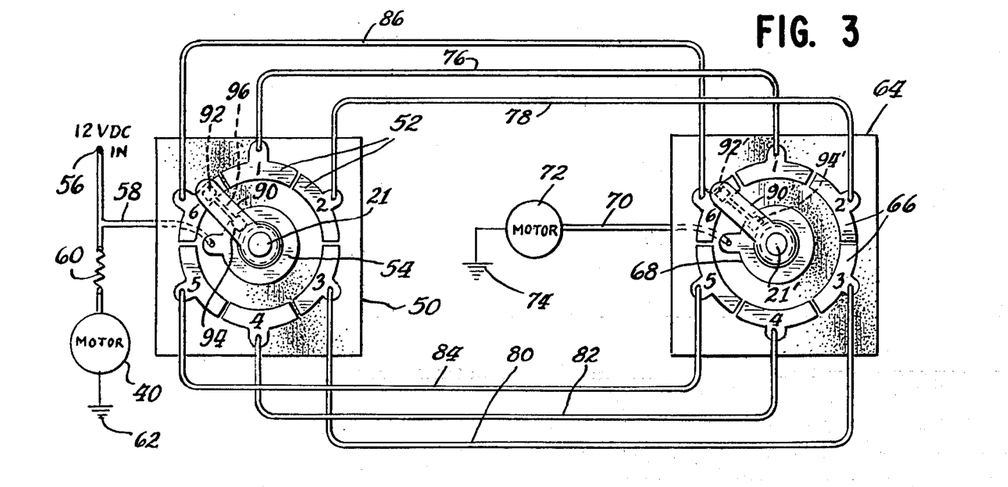
FIG. 3 is a schematic bottom plan view, looking generally in the direction of the arrows 3—3 of FIG. 2, illustrating a master drive motor and a slave drive motor and means for supplying power to the slave drive motor only when the associated slave light is in a predetermined rotational phase relation with the master light.

FIG. 3 illustrates a master collector ring broad 50 associated with the master light assembly 10 of FIG. 1. The board 50 has mounted thereon a segmented outer collector ring 52 comprising six individual ring segments, and a continuous inner ring 54. The inner ring 54 is connected to a 12 VDC power source 56 through line 58. In addition, the power source 56 is connected to the master drive motor 40 through a resistance 60, and motor 40 is grounded as shown at 62.

A slave collector ring board 64 is shown in FIG. 3 having mounted thereon a segmented outer collector ring 66 having the same number and type of individual ring segments as ring 52, and a continuous inner ring 68. The slave board 64 is associated with slave light assembly 12 of FIG. 1, and continuous inner ring 68 is connected through line 70 to a slave drive motor 72 which is grounded as shown at 74.

It will further be seen the outer segments of master ring 52 are electrically connected to the outer segments of slave ring 66. The first segments of each ring are connected by lead 76, the second segments are connected by lead 78, and the remaining sets of segments are similarly connected by leads 80, 82, 84 and 86. It should be understood all of the interconnecting leads 76, 78, 80, 82, 84 and 86 may be contained in a single cable which comprises the only connection between the master light unit 10 and the slave light unit 12.

Referring to FIGS. 2 and 3, a master brush supporting wiper arm 90 is secured to the lower end of master mounting shaft 21 for rotation therewith. The wiper arm 90 carries brushes 92 and 94 radially spaced on its upper surface for engagement respectively with the outer and inner collector rings 52 and 54. The brushes 92 and 94 are electrically connected as shown at 96. FIG. 2 shows the manner in which board 50 is mounted on a support bracket 98 with the operative side of the board having the collector rings 52 and 54 facing downwardly for cooperation with brushes 92 and 94 on master wiper arm 90.

A similar brush supporting wiper arm 90' (see FIG. 3) is secured on mounting shaft 21' of the slave drive motor (shown only schematically at 72 in FIG. 3) for the slave light unit 12. In addition, a pair of brushes 92' and 94' are carried on wiper arm 90' for engagement with the outer and inner rings 66 and 68 on the board 64 for the slave light unit.

The operation of the foregoing master and slave light units will now be described with reference to FIG. 3. When the system is turned on, power source 56 is continuously connected with master drive motor 40 through resistance 60, and thus the lampholder assembly 28 of the master light unit 10 is rotated continuously. However, power source 56 is connected to drive motor 72 for slave light unit 12 only when the lampholder (not shown) of the slave unit and its associated wiper arm 90' are in a predetermined rotational phase relation with the lampholder 28 and associated wiper arm 90 of master unit 10.

Power source 56 is connected through lead 58 to the inner collector ring 54 associated with master board 50, and power passes from inner brush 94 through lead 96 to outer brush 92 which is in contact with one of the six segments of outer collector ring 52 associated with master light unit 10. In the position illustrated in FIG. 3, outer brush 92 is in contact with segment no. 6 of outer collector ring 52, which segment is connected through lead 86 to a corresponding segment no. 6 of slave outer collector ring 66 associated with board 64 of the slave light unit 12. Accordingly, if brush supporting wiper arm 90' of the slave light unit is in contact with segment no. 6 of collector ring 66, power will be conducted through slave brushes 92' and 94' to inner collector ring 68 and through lead 70 to slave drive motor 72.

It will be understood from the foregoing that power from power source 56 will be conducted through the master wiper arm 90 and slave wiper arm 90' to slave drive motor 72 for the slave light unit 12 only during the time that slave wiper arm 90' is in the same segment as master wiper arm 90. If slave wiper arm 90' is in a different segment, no power will be conducted to slave drive motor 72, and the slave lampholder assembly (not shown) and its associated wiper arm 90' will then stop rotating.

When a non-synchronized condition as described above occurs, it will not be maintained for more than one revolution of the master light unit. As the master wiper arm 90 continues to rotate, it must within one revolution reach a segment corresponding to the segment in which the slave wiper arm 90' is located, and when the latter condition occurs, power will again be supplied to the slave drive motor 72 to effect synchronous rotation of the master and slave rotating lights.

In the foregoing manner, the slave light unit 12 is rotated by the slave motor 72 in synchronization with rotation of the master light unit 10, and if for any reason the two rotating lights get out of synchronization, they will always get back into synchronized relation within one revolution of the master rotating light.

Thus, if the two lights 10 and 12 and their associated wiper arms 90 and 90' get out of synchronization, power to the slave drive motor 72 will be disconnected as described above, and as a result the slave lampholder assembly and associated wiper arm 90' will stop with the latter arm engaged with one of the six outer ring segments 66. As the master drive motor 40 continues to rotate the master lampholder assembly 28 and associated wiper arm 90, within one revolution the arm 90 will come into engagement with that one of the master outer ring segments 52 which is electrically wired to the slave outer ring segment 66 with which arm 90' is engaged. When the latter condition is achieved, which must be within one revolution of the master lampholder assembly 28, power will be conducted through slave wiper arm 90' to slave drive motor 72, after which the two rotating lights will again be driven in synchronized relation.

It has been found desirable to control the speed of rotation of the master drive motor 40 so it operates at a slightly lower speed than slave drive motor 72. It is intended a drive motor will be associated with each rotating light, and the drive motors will be of the same type and size. However, due to tolerances, it is possible master drive motor 40 might run slightly faster than slave drive motor 72. In the latter event, there would be a tendency for master drive motor 40 to drive master lampholder assembly 28 and wiper arm 90 into a segment zone 52 before the slave drive motor 72 had driven its corresponding wiper arm 90' into a corresponding zone, and in that event power would be disconnected from slave drive motor 72 causing the slave light to stop. In order to prevent such an occurrence, resistance 60 is included in the line between power source 56 and master drive motor 40. Accordingly, motors 40 and 72 are preferably of the same size and type, and resistance 60 serves to control the speed of the master drive motor 40 so it is slightly less than that of the slave drive motor 72.

In the embodiment described herein, each of the outer collector rings 52 and 66 comprises six ring segments, but it will be understood a greater or lesser number of segments may be utilized. For example, slave motor 72 will run smoother, particularly at lower speeds, if the number of segments is increased. However, it is believed the operation is quite satisfactory with the use of six ring segments as illustrated. On the other hand, it will also be noted that certain segments 52 on the master board 50 can be interconnected to each other. Thus, segment no. 2 and segment no. 6 on master board 50 may be interconnected to each other. In a similar fashion, outer ring segment no. 2 and segment no. 6 on slave board 64 may be connected to each other. As a result, one of the interconnecting wires 78 and 86 could be eliminated. Obviously, additional ring segments on a given board could be interconnected to each other, thereby reducing further the number of wires required to electrically connect the master and slave light units. However, the effect is to reduce the number of independent segments and thereby reduce the effectiveness of the system.

It should be recognized that in certain known warning light systems comprising two or more rotating lights, a single drive motor is utilized to drive the lights. For example, as mentioned hereinabove, it is known to drive two rotating lights by use of sprocket members and an interconnecting drive chain, in which case a single drive motor is used. Also, a plurality of rotating lights may be interconnected by a gear train as in the aforementioned copending patent application, Ser. No. 868,975, now U.S. Pat. No. 4,240,062 and with such a system only a single drive motor is utilized. In accordance with the present invention, each rotating light is provided with its own separate drive motor, one motor serving as a master drive motor as shown at 40 in FIG. 3 and the other drive motors functioning as electrically synchronized slave motors as shown at 72.

Even though additional drive motors are required in accordance with the present invention, it is a significant advantage that relatively inexpensive permanent magnet motors may be utilized, and they may be of a smaller size than would be required if a single motor were used to drive a plurality of lights. It is therefore an advantage of the present invention that the master and slave light units can be maintained in synchronization with only an electrical cable required to connect the light units, and relatively simple and inexpensive permanent magnet motors may be utilized to rotate the lights.

It will further be understood that if desired the board 50 may be eliminated, and instead the outer and inner collector rings 52 and 54 of FIG. 3 may be mounted on the lower side of the upper board (not shown). Thus, it was described hereinabove the manner in which a pair of brushes 42 and 44 (see FIG. 2) are supported by a bracket or arm 46 for rotation with the lamp mounting shaft 21, and during such rotation the brushes contact a collector ring assembly (not shown) mounted immediately beneath the brushes to supply electrical power to the rotating lamps 30 and 32.

Accordingly, it is necessary in the foregoing embodiment to provide one board with a collector ring thereon for cooperation with the brushes 42 and 44. Therefore, if desired, collector rings 52 and 54 of FIG. 3 may be mounted on the opposite side of that same board, and master wiper arm 90 would then be located immediately beneath the board. Thus, while the embodiment described above includes two single-sided boards, it is possible to substitute one double-sided board for supporting collector rings to cooperate with the brushes 42, 44, 92 and 94 associated with master light unit 10. In addition, it is possible to mount a plurality of collector rings on a single one-sided board.

Another advantage of the present invention is that it is a simple matter to create and maintain any desired rotational phase relationship between the master and slave light units. When segment no. 1 of master collector ring 52 is electrically wired to segment no. 1 of slave collector ring 66, the respective master and slave wiper arms 90 and 90' will be synchronized at the location of those segments. However, one of the boards 50 or 64 may be rotated relative to the other to create any desired out-of-phase relation between the master and slave lights 10 and 12. It will therefore be understood the lampholder assemblies may be maintained in phase or they may be maintained out of phase by a predetermined angle to produce a desired flashing light effect.

An alternative embodiment of the invention involves the combination of a master motor and a plurality of slave motors, each slave motor being associated with a corresponding slave light, but there being no master light. The concept is that two or more slave lights may be provided, and the master light per se may be eliminated, thereby giving the designer a wide choice for the location of the master drive motor which in the first embodiment of FIGS. 1-3 must be proximate to the lights.

Such a master motor assembly includes motor 40 connected to power source 56 through resistor 60, in combination with the master slip ring assembly including board 50 and ring segments 52. Two or more slave light units are driven by power conducted over leads 76, 78, 80, 82, 84 and 86 as shown in FIG. 3, the particular lead being determined by the position of master wiper arm 90.

In the foregoing embodiment, no master rotating light is provided, but the plurality of slave lights are coordinated with the position of master wiper arm 90 driven by master motor 40, and as a result the slave lights are synchronized with each other. In such a system, the master motor assembly including the master slip ring assembly 50, 52 may be located anywhere within the vehicle on which the light system is mounted, thereby permitting more sophisticated control of the motor for greater precision speed control. If desired, master motor 40 may be a stepper motor in order to achieve more precise control of the speed of the slave lights. When a stepper motor is utilized, it may not be necessary to provide resistance 60 in the master motor circuit.

Figure 4:
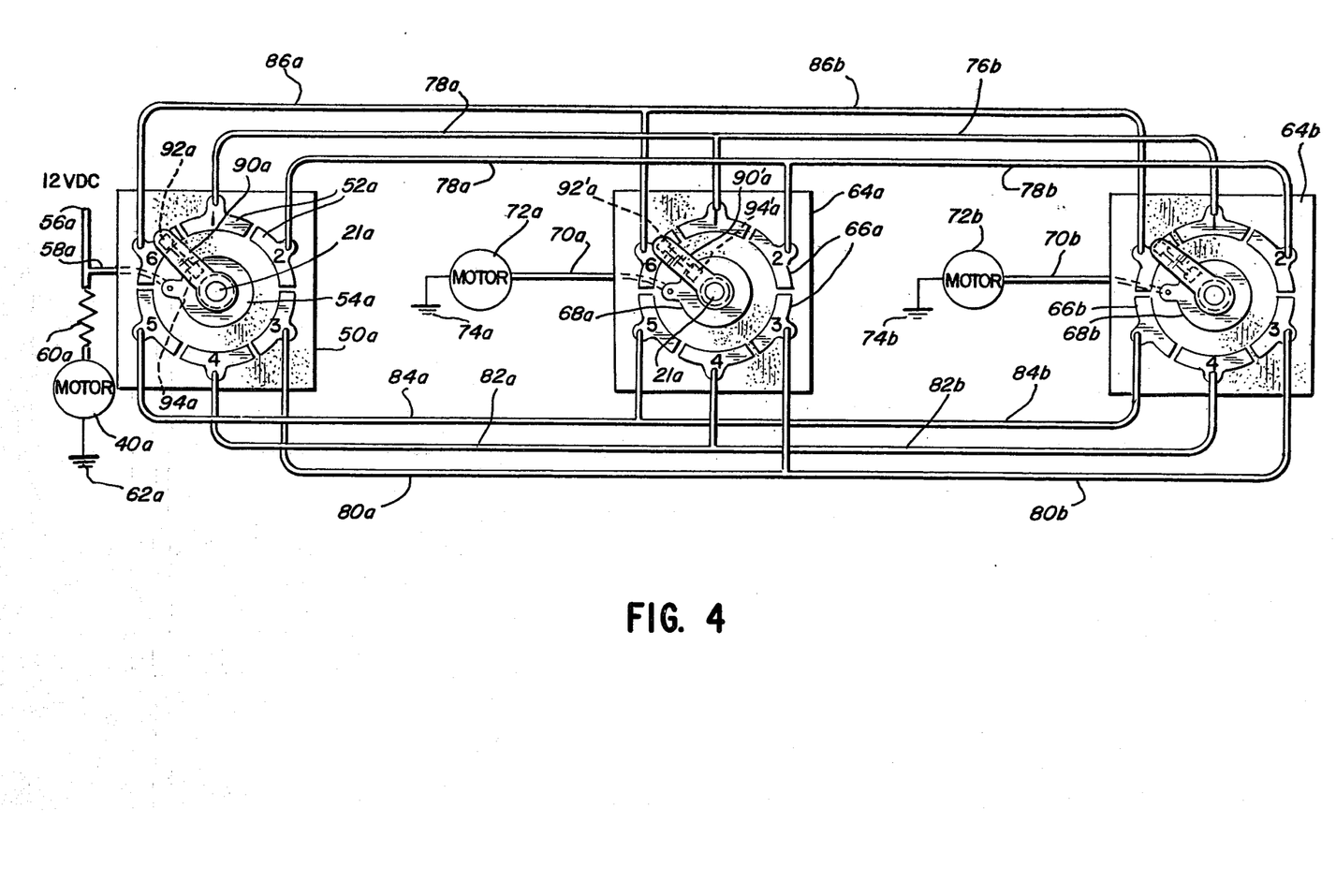
FIG. 4 is a schematic bottom plan view of an alternative embodiment of the invention where two slave lights are provided, each being associated with a corresponding slave drive motor, in combination with a master drive motor which is not associated with a corresponding light.

FIG. 4 illustrates an embodiment as described above including a master collector ring board 50a having mounted thereon a segmented outer collector ring 52a comprising six individual ring segments, and a continuous inner ring 54a. The inner ring 54a is connected to a 12 VDC power source 56a through lead 58a. Power source 56a is connected to master drive motor 40a through resistance 60a, and motor 40a is grounded at 62a. Motor 40a drives master wiper arm 90a, but no master light is provided.

A first slave collector ring board 64a has mounted thereon a segmented slave outer collector ring 66a having the same number and type of individual ring segments as ring 52a, and a continuous inner ring 68a. The board 64a is associated with a slave light assembly of the same type as the master light assembly shown at 10 in FIG. 1, and continuous inner ring 68a is connected through line 70a to a slave drive motor 72a which is grounded at 74a. The outer segments of master ring 52a are electrically connected to the outer segments of the first slave ring 66a by leads 76a, 78a, 80a, 82a, 84a and 86a.

A second slave collector ring board 64b has mounted thereon a segmented outer collector ring 66b having the same number and type of individual ring segments as ring 52a, and a continuous inner ring 68b. The board 64b is associated with a second slave light assembly of the type shown at 12 in FIG. 1, and continuous inner ring 68b is connected through line 70b to a second slave drive motor 72b which is grounded at 74b. The outer segments of the first slave ring 66a are electrically connected to the outer segments of the second slave ring 66b by leads 76b, 78b, 80b, 82b, 84b and 86b.

It will thus be understood that in accordance with the embodiment of FIG. 4, three motors are provided, and each is associated with a corresponding wiper-collector ring synchronizing unit. The master drive motor 40a and collector ring board 50a are not associated with a rotatable light and thus can be placed in any desired location without regard to the location of the lights which in the case of emergency vehicles are normally mounted on the roof. The other motors such as slave motor 72a and its collector ring board 64a, and slave motor 72b and its collector ring board 64b, are each associated with a slave light, and the two or more slave lights are synchronized with each other by being synchronized with the position of the common master wiper arm 90a.

Figure 5:
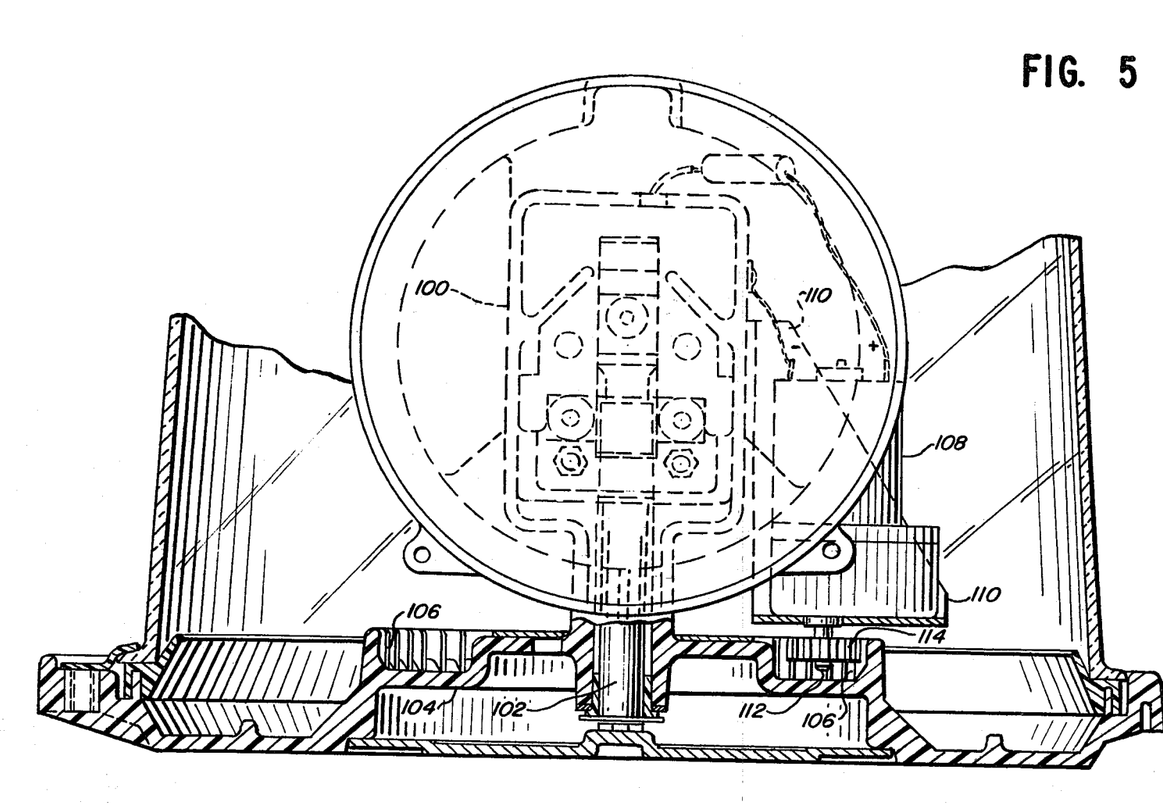
FIG. 5 is a vertical section illustrating a further embodiment of the invention where each rotatable lampholder has a corresponding drive motor mounted directly thereon for conjoint rotation with the lamp.
Figure 6:
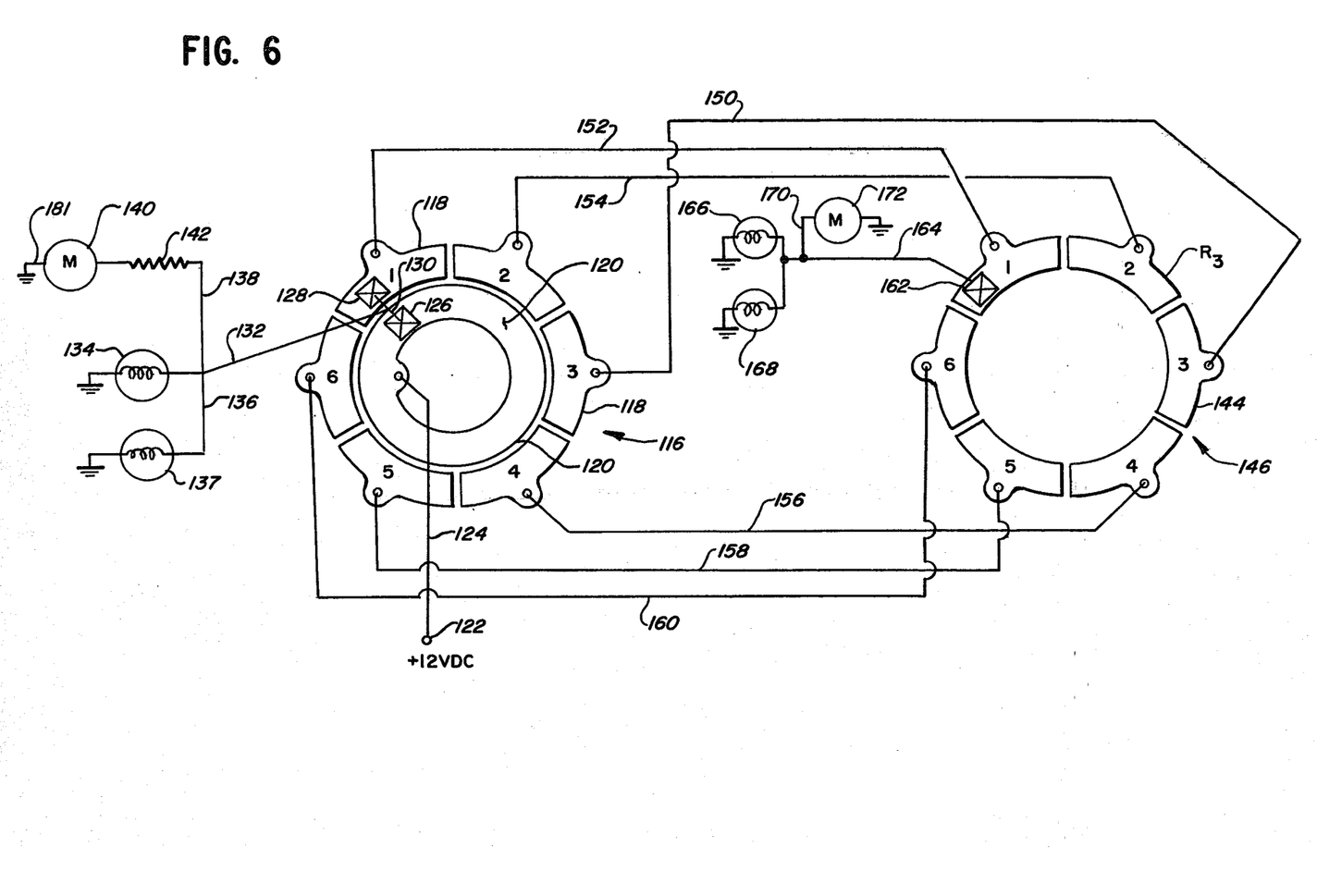
FIG. 6 is a schematic top plan view relating to the embodiment of FIG. 5 and illustrating a master drive motor and a slave drive motor and means for supplying power to the slave drive motor only when the rotatable slave light is in a predetermined phase relation with the master light.
Figure 7:
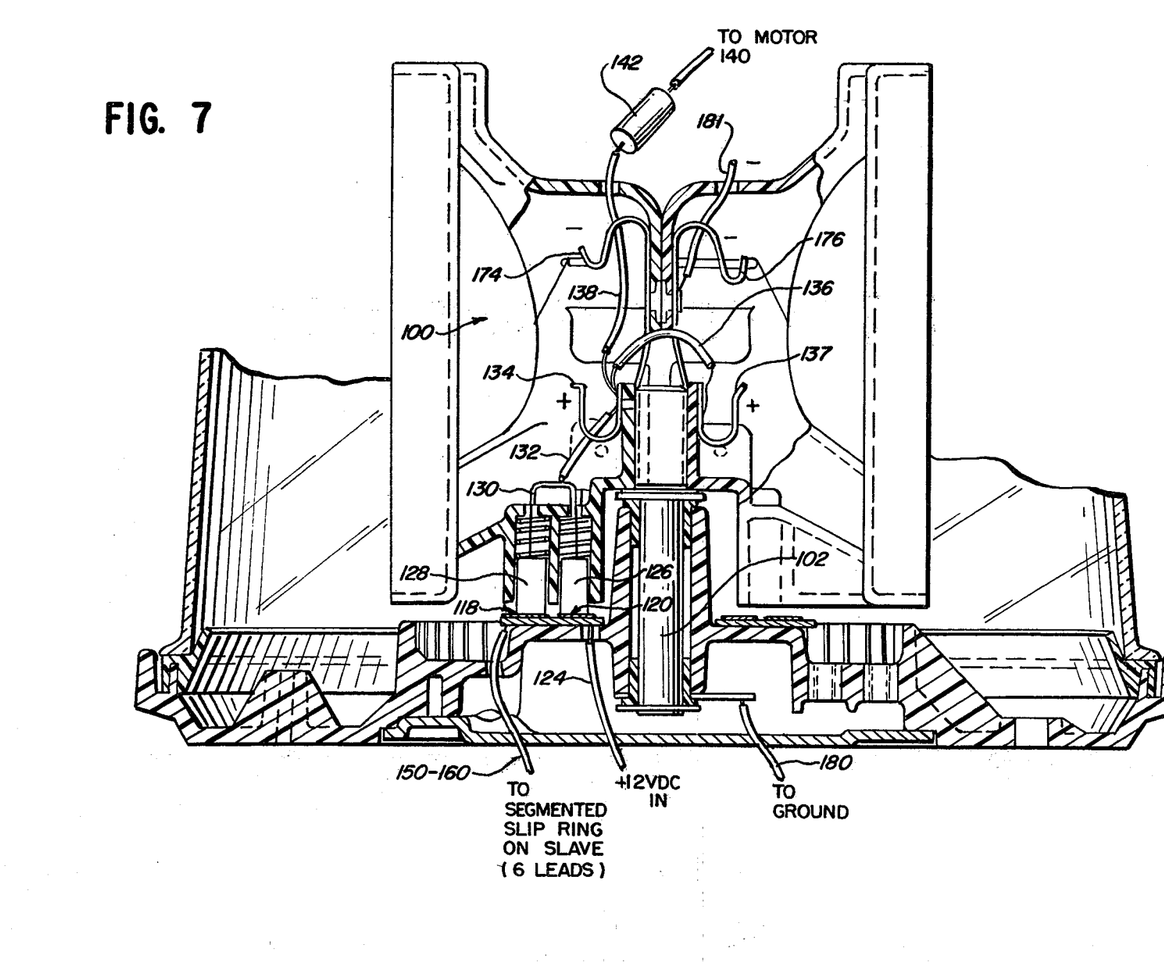
FIG. 7 is a vertical section illustrating a master rotatable lampholder for the embodiment of FIG. 5.

Reference is now made to the embodiment of FIGS. 5-7 in which each rotatable lamp assembly has its drive motor mounted directly to the lampholder for conjoint rotation therewith so as to simplify the method of synchronization and reduce the number of collector rings required to supply power to the drive motors and the lamps. FIG. 5 illustrates a lampholder 100 mounted on a shaft 102 for rotation about the axis of the shaft. A fixed base 104 includes an internal spur gear 106. A drive motor 108 is fixedly mounted by a bracket 110 to the side of the lampholder 100 for conjoint rotation about the axis of shaft 102. The drive motor has a drive shaft 112 on which a pinion gear 114 is mounted for engagement with the fixed internal spur ring gear 106. It will thus be understood that in the foregoing embodiment, each rotatable light has its drive motor mounted to the lamp assembly for rotation therewith.

FIG. 6 illustrates a master collector ring assembly 116 including a segmented outer collector ring 118 comprising six individual ring segments, and a continuous inner ring 120. A 12 VDC power source 122 is connected through lead 124 to the inner ring 120. A pair of brushes comprising an inner brush 126 and an outer brush 128 (see also FIG. 7) are carried by the lampholder assembly 100 for rotation therewith, the inner brush 126 being in contact with inner ring 120 and the outer brush 128 being in contact with outer segmented ring 118.

Electrical power is conducted from inner ring 120 through inner brush 126 and lead 130 to outer brush 128, whereby as lampholder assembly 100 rotates, outer brush 128 conducts power to the various segments of the outer ring 118. In addition, power from inner brush 126 is conducted through lead 132 to a first lamp 134, and lead 136 conducts power to a second lamp 137. In addition, power from brush 126 is conducted over lead 138 to master drive motor 140 through resistor 142.

Each of the six outer ring segments 118 of the master ring assembly 116 is connected to a corresponding outer ring segment 144 of a slave ring assembly 146 through a corresponding one of the leads 150, 152, 154, 156, 158 and 160. Thus, power source 122 is connected to one of the slave outer ring segments 144 through one of the foregoing leads, the segment 144 which receives power being the one connected to the master outer ring segment 118 in contact with brush 128. A brush 162 associated with a rotatable slave light (not shown) receives power from the outer ring segments 144 and transmits the power over lead 164 to a pair of lamps 166 and 168 and over lead 170 to a slave drive motor 172.

It will be understood from the foregoing that when the rotatable slave light and associated brush 162 is in phase with the master light and associated brush 128, so that brushes 128 and 162 are in contact with respective outer ring segments which are electrically connected by one of the leads 150, 152, 154, 156, 158 and 160, power will be conducted from power source 122 to slave drive motor 172.

FIG. 7 further illustrates master lampholder 100 in accordance with the foregoing embodiment and it shows a positive spring contact 134 for one lamp which receives power through lead 132, and a second positive spring contact 137 for a second lamp which receives power over lead 136. Unit ground is provided through negative spring contacts 174 and 176 which are both in contact with central shaft 102. Ground is accomplished from shaft 102 through bearing 178 and lead 180. A ground return lead from master drive motor 140 is shown at 181 in FIGS. 6 and 7.

It will be seen master lampholder 100 has only two collector rings, one continuous 360 degree ring 120 and ring 118 with several segments, and brush 126 is used to transfer power to both lamps 134 and 137 and to master drive motor 140 as well as to segmented ring 118 through brush 128. When power reaches slave brush 162, it transmits power through lead 164 to the two lamps 166 and 168 and to slave drive motor 172. On the slave unit, only the one segmented ring 144 is required, since the one ring provides power to both lamps 166 and 168 and to the slave drive motor 172.

It should be noted there is only an open gap of approximately 1/16th inch width between the segments 144, whereas the brush 162 is ¼ inch square, and thus brush 162 bridges the gap and provides continuous lamp operation. The slave light assembly is the same as illustrated in FIG. 7 for the master light assembly 100, except there is only the outer segmented ring 144 and the single brush 162, and thus there are no slave components comparable to master inner ring 120 and master inner brush 126 associated with the master light unit 100.

In the various embodiments described hereinabove, reference has been made to a 12 VDC power source as shown for example at 56 in FIG. 3. However, it should be understood that various other common voltages may be used as a power source such as 24 VDC, 36 VDC, 48 VDC, 65 VDC and 72 VDC as well as other suitable power sources.

What is claimed is:

1. An electrically synchronized rotating light system including at least two rotating lights electrically wired to synchronize their speed and phase, said system comprising, in combination, a first rotatable master light, a master drive motor operatively connected with said master light for rotating the same, a second rotatable slave light, a slave drive motor operatively connected with said slave light for rotating the same, a power source connected to said master drive motor for effecting rotation of said master light, and synchronizing means interposed between said power source and said slave drive motor for conducting power to said slave drive motor only when said slave light is in a predetermined phase relation with said master light.

2. An electrically synchronized rotating light system as defined in claim 1 where said synchronizing means includes segmented collector ring means which comprise part of an electrical circuit for conducting power from said power source to said slave drive motor, said segmented collector ring means being in a closed circuit position when said slave light is in a predetermined phase relation with said master light and being in an open circuit position when said slave light is not in said predetermined phase relation with said master light.

3. An electrically synchronized rotating light system as defined in claim 2 including first brush means connected with said master light and rotatable therewith for indicating the position of said master light, second brush means connected with said slave light and rotatable therewith for indicating the position of said slave light, and synchronizing means interposed between said power source and said slave drive motor and cooperating with said first and second brush means for conducting power to said slave drive motor only when said first and second brush means are in a predetermined phase relation with each other.

4. An electrically synchronized rotating light system as defined in claim 3 including a first segmented collector ring associated with said first brush, said first brush being positioned to wipe seriatim against the segments of said first ring during rotation of said master light, and a second segmented collector ring associated with said second brush, said second brush being positioned to wipe seriatim against the segments of said second ring during rotation of said slave light, said segments of said first ring being electrically connected to corresponding segments of said second ring, said first ring being connected to said power source through said first brush and said second ring being connected to said slave motor through said second brush whereby power is conducted to said slave motor when said first and second brushes are in contact with corresponding electrically connected segments of said first and second rings thereby indicating said master and slave lights are in a predetermined phase relation.

5. An electrically synchronized rotating light system as defined in claim 4 including a resistance between said power source and said master drive motor whereby the speed of said master drive motor is made slightly lower than the speed of said slave drive motor.

6. An electrically synchronized rotating light system including at least two rotating lights electrically wired to synchronize their speed and phase, said system comprising, in combination, a master drive motor, a first rotatable slave light, a first slave drive motor operatively connected with said slave light for rotating the same, a second slave light, a second slave drive motor operatively connected with said second slave light for rotating the same, a power source connected to said master drive motor, master synchronizing means driven from said master drive motor, first slave synchronizing means driven from said first slave drive motor, and second slave synchronizing means driven from said second slave drive motor, said master and first slave synchronizing means being interposed between said power source and said first slave drive motor for conducting power to said first slave drive motor only when said first slave light is synchronized with said master synchronizing means, and said master and second slave synchronizing means being interposed between said power source and said second slave drive motor for conducting power to said second slave drive motor only when said second slave light is synchronized with said master synchronizing means, whereby said first and second slave lights are synchronized with each other.

7. An electrically synchronized rotating light system as defined in claim 6 where said master synchronizing means includes master rotatable arm means, said first slave synchronizing means includes first slave rotatable arm means connected with said first slave light and rotatable therewith for indicating the position of said first slave light, said second slave synchronizing means including second slave rotatable arm means connected with said second slave light and rotatable therewith for indicating the position of said second slave light, first circuit means interposed between said power source and said first slave drive motor and cooperating with said master and first slave rotatable arm means for conducting power to said first slave drive motor only when said master and first slave rotatable arms are in predetermined phase relation, and second circuit means interposed between said power source and said second slave drive motor and cooperating with said master and second slave rotatable arm means for conducting power to said second slave drive motor only when said master and second slave rotatable arms are in predetermined phase relation.

8. An electrically synchronized rotating light system as defined in claim 7 including a master segmented collector ring associated with said master rotatable arm, said master arm being positioned to wipe seriatim against the segments of said master ring when driven by said master drive motor, a first slave segmented collector ring associated with said first slave rotatable arm, said first slave arm being positioned to wipe seriatim against the segments of said first slave ring during rotation of said first slave light, and a second slave segmented collector ring associated with said second slave rotatable arm, said second slave arm being positioned to wipe seriatim against the segments of said second slave ring during rotation of said second slave light, said segments of said master ring being electrically connected to corresponding segments of said first and second slave rings, said master ring being connected to said power source through said master rotatable arm, said first slave ring being connected to said first slave motor through said first slave rotatable arm and said second slave ring being connected to said second slave motor through said second slave rotatable arm, whereby power is conducted to said first slave motor when said master and first slave rotatable arms are in contact with corresponding electrically connected segments of said master ring and first slave ring and power is conducted to said second slave motor when said master and second slave rotatable arms are in contact with corresponding electrically connected segments of said master ring and second slave ring, whereby said first and second slave lights are maintained in predetermined phase relation with said master rotatable arm and thus with each other.

9. An electrically synchronized rotating light system as defined in claim 1 where each rotatable light has its associated drive motor directly mounted to the lampholder of the light for conjoint rotation therewith so as to simplify said synchronizing means.

10. An electrically synchronized rotating light system as defined in claim 6 where each rotatable light has its associated drive motor directly mounted to the lampholder of the light for conjoint rotation therewith to simplify said synchronizing means.

* * * * *